US008908038B2

(12) United States Patent
Li et al.

(10) Patent No.: US 8,908,038 B2
(45) Date of Patent: Dec. 9, 2014

(54) VEHICLE DETECTION DEVICE AND VEHICLE DETECTION METHOD

(75) Inventors: Xue Li, Kanagawa (JP); Hideaki Hirai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 341 days.

(21) Appl. No.: 13/310,001

(22) Filed: Dec. 2, 2011

(65) Prior Publication Data

US 2012/0147187 A1 Jun. 14, 2012

(30) Foreign Application Priority Data

Dec. 8, 2010 (JP) .................................. 2010-274105
Nov. 4, 2011 (JP) .................................. 2011-242374

(51) Int. Cl.
*H04N 7/18* (2006.01)
*G06K 9/32* (2006.01)
*G06K 9/00* (2006.01)
*G01J 4/00* (2006.01)

(52) U.S. Cl.
CPC .......... *G06K 9/00791* (2013.01); *G06K 9/3233* (2013.01)
USPC .......................................... 348/148; 356/364

(58) Field of Classification Search
None
See application file for complete search history.

(56) References Cited

U.S. PATENT DOCUMENTS

| 3,992,571 | A | 11/1976 | Garlick et al. |
| 5,264,916 | A | 11/1993 | Bushman |
| 5,345,308 | A | 9/1994 | Bushman |
| 2005/0195383 | A1* | 9/2005 | Breed et al. .................. 356/4.01 |
| 2010/0231717 | A1 | 9/2010 | Sasaki et al. |
| 2011/0169943 | A1 | 7/2011 | Bachman, II et al. |

FOREIGN PATENT DOCUMENTS

| JP | 2007-86720 | 4/2007 |
| JP | 2007-322374 | 12/2007 |
| JP | 2010-14706 | 1/2010 |
| WO | WO 2008/097562 A1 | 8/2008 |

OTHER PUBLICATIONS

English Translation of JP 2007-086720.*
English Translation of JP 2007-322374.*

(Continued)

*Primary Examiner* — Behrooz Senfi
*Assistant Examiner* — Mohammed Jebari
(74) *Attorney, Agent, or Firm* — Oblon, Spivak, McClelland, Maier & Neustadt, L.L.P.

(57) ABSTRACT

A vehicle detection device having an imaging device to capture two respective polarized images from two polarized light beams having different polarization directions contained in light received from an imaging area including a road surface on which one's own vehicle is traveling and a vehicle traveling on the road surface and a polarization difference calculation device to calculate a polarization difference indicating the ratio of a luminance difference between the two respective polarized images to the luminance total thereof for respective identification processing areas formed by dividing the two respective polarized images taken by the imaging device, and a vehicle area detection device to conduct a vehicle area detection process of detecting a vehicle area displaying the vehicle in the imaging area based on the polarization difference of the respective identification processing areas calculated by the polarization difference calculation device.

9 Claims, 11 Drawing Sheets

(56) References Cited

OTHER PUBLICATIONS

Cornell S. L. Chun Ed—Firooz Sadjadi, et al. "The Physics of Polarization-Sensitive Optical Imaging", Physics of Automatic Target Recognition; [Advanced Sciences and Technologies for Security Applications], XP008149474, Jan. 1, 2007, pp. 91-104.

G. P. Konnen, "Polarized Light in Nature", Press Syndicate of the University of Cambridge, XP002670559, 1985, 13 pages.

Pandian A., "Robot Navigation using Stereo Vision and Polarization Imaging", Institut Universitaire de Technologie IUT LE Creusot, Universitéa de Bourgogne, XP002670602, 2008, pp. 15-22, 28-32.

Extended Search Report issued Mar. 27, 2012 in European Patent Application No. 11191965.0-1224.

* cited by examiner

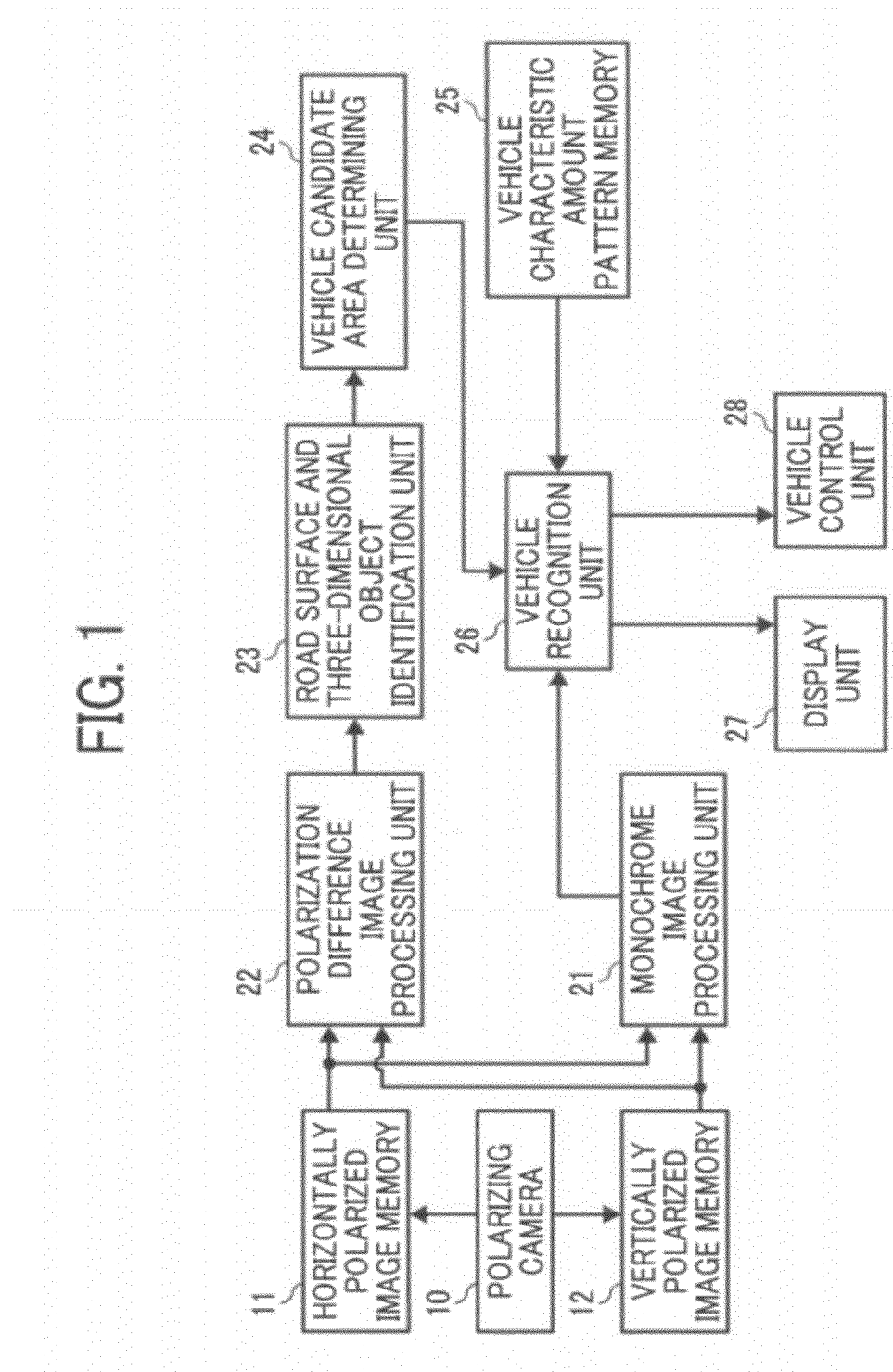

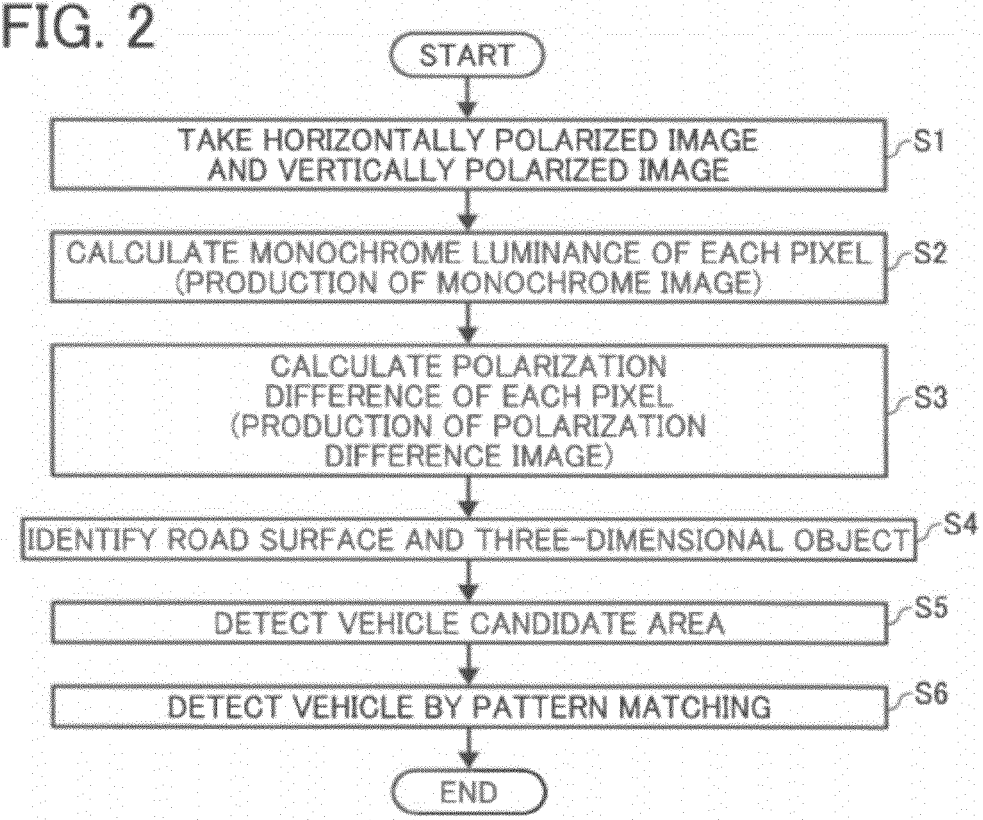
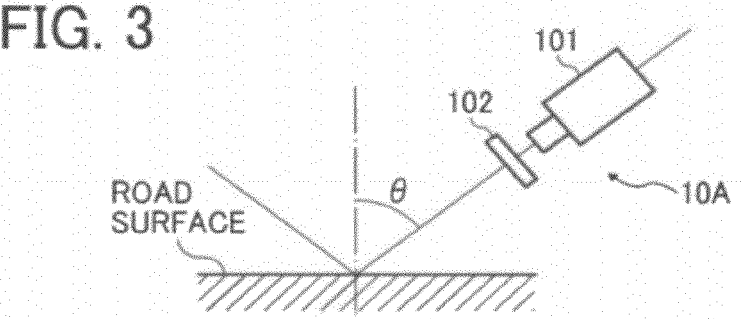
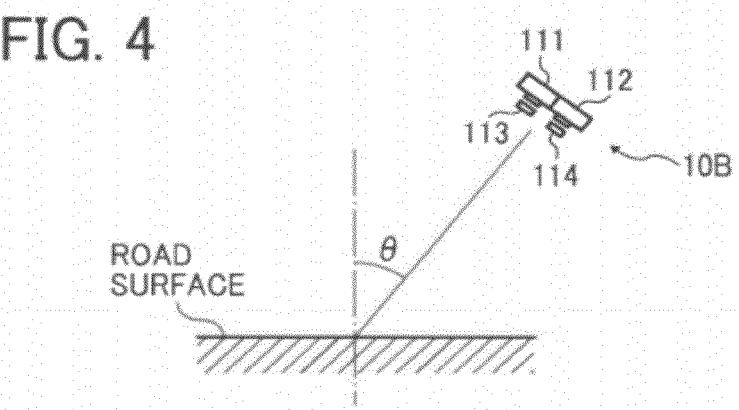

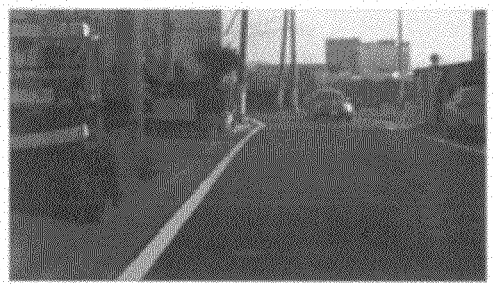
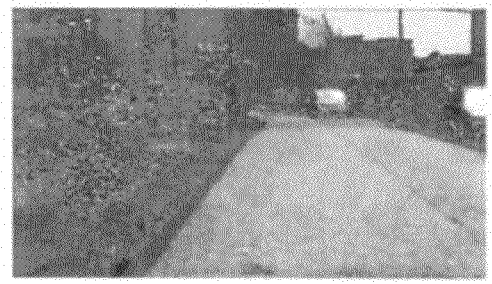
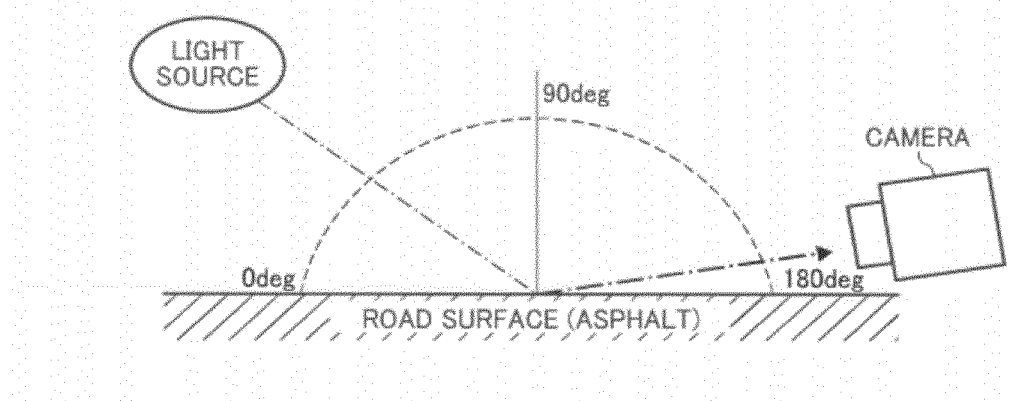

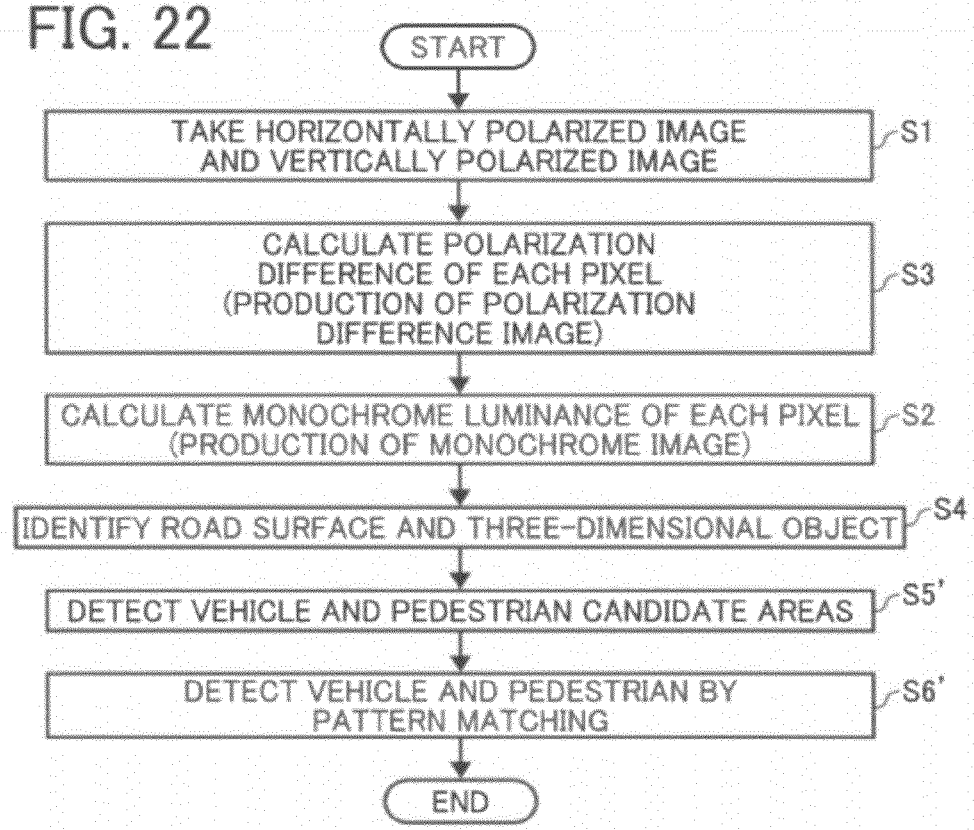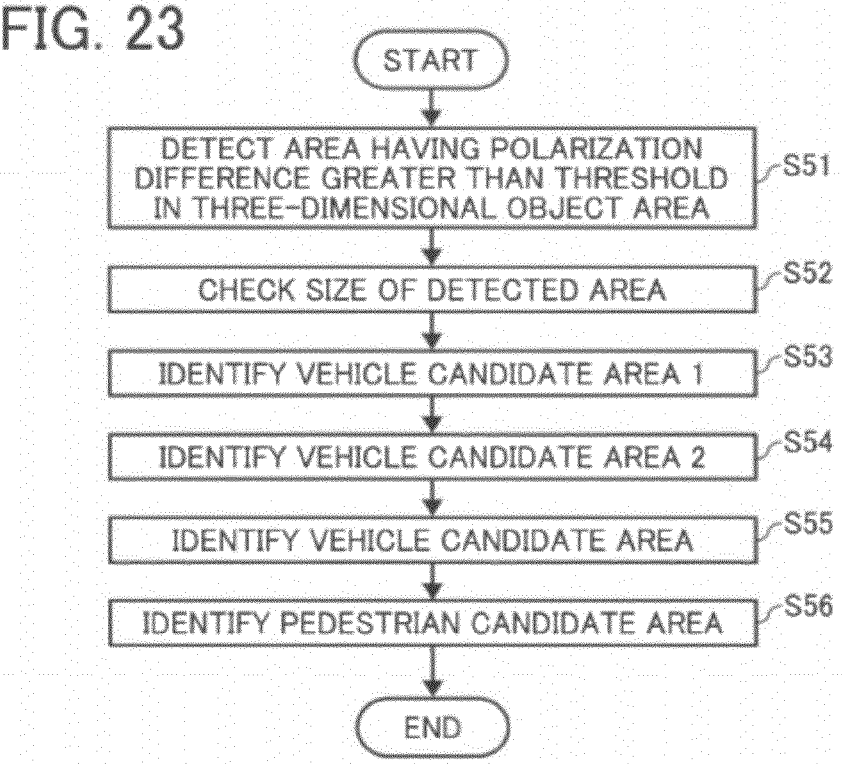

VEHICLE DETECTION DEVICE AND VEHICLE DETECTION METHOD

CROSS-REFERENCE TO RELATED APPLICATIONS

This patent application is based on and claims priority pursuant to 35 U.S.C. §119 to Japanese Patent Application Nos. 2010-274105 and 2011-242374, filed on Dec. 8, 2010 and Nov. 4, 2011, respectively in the Japan Patent Office, the entire disclosures of which are hereby incorporated herein by reference.

FIELD OF THE INVENTION

The present invention relates to a vehicle detection device and a vehicle detection method.

BACKGROUND OF THE INVENTION

Vehicle detection devices are widely used in vehicle operation and instrument control systems as well as information provision systems that provide useful information to a driver of a vehicle. For example, there are advanced driver assistance systems such as Adaptive Cruise Control (ACC) to ease the burden of driving on the driver. Such vehicle control systems have various features, such as automatic braking or alarms to avoid collision or relieve the shock of collision, and vehicle speed control to maintain a minimum safe inter-vehicular distance.

To improve performance, it is necessary to be able to recognize (identify) other vehicles around one's own vehicle. Therefore, various vehicle recognition devices have been proposed.

For example, unexamined Japanese patent application publication no. 2010-14706 (JP-2010-14706-A) describes a vehicle detection system that irradiates with a laser beam a predetermined area through which a vehicle passes within the imaging area of the system and produces an image showing a three-dimensional form of the vehicle that passes through the predetermined area using the reflected laser beam to improve characteristic detection accuracy used for identifying the vehicle appearing in the imaging area.

Most typical vehicle detection devices identify an image area where a vehicle traveling on the road appears using differences in luminance within the image. However, since the captured image contains many noise components (luminance information that degrades identification accuracy), it is not possible to accurately identify other vehicles simply by the luminance of the image.

JP-2009-295963-A describes a method in which two polarized images taken by an imaging device are divided into respective predetermined processing areas, calculates a degree of difference in polarization (hereinafter also simply "polarization difference") that is the ratio of the difference in luminance between each processing area of the two polarized images to the total luminance thereof, and identifies a three-dimensional object on the road using the calculated result. In detail, based on the calculated polarization difference, adjacent processing areas corresponding to the identification object are identified as an image area of the identification object. According to this method, three-dimensional objects in an imaging area can be identified with a high degree of precision even in situation in which objects cannot be identified with a high degree of precision by a typical method using the difference in luminance because there are no clear difference in luminance. However, the detection accuracy of systems like those described above can be adversely affected by weather and road conditions that diminish or conversely exaggerate contrast, such as wet road surfaces, cloudy or very sunny weather, or alternating sun and shade.

SUMMARY OF THE INVENTION

In view of the foregoing, the present invention provides an improved vehicle detection device having a vehicle detection device including an imaging device to capture two different polarized images from two differently polarized light beams reflected within a vehicle detection device imaging area, the imaging area containing a road surface, a polarization difference calculation device that divides each of the two polarized images captured by the imaging device into predetermined identification processing areas and calculates a degree of polarization difference indicating a ratio of a luminance difference between the two polarized images to a total luminance thereof for each predetermined identification processing area, and a vehicle area detection device to conduct a vehicle area detection process of detecting a vehicle area displaying a vehicle in the imaging area based on the polarization difference of the identification processing areas calculated by the polarization difference calculation device.

It is preferable that, in the vehicle detection device described above, the vehicle area detection device determines whether the polarization differences for the identification processing areas calculated by the polarization difference calculation device are within a predetermined range, identifies an identification processing area having a value within the predetermined range as a window of the vehicle, and conducts the vehicle area detection process using the identification.

It is still further preferable that the vehicle detection device described above further includes a vehicle characteristic data memory device that stores vehicle characteristic data indicating characteristics of the vehicle, wherein the vehicle area detection device determines whether the identification processing areas identified as the window are the vehicle areas that display the vehicle using the luminance total of the two polarized images of the identification processing areas and the vehicle characteristic data stored in the vehicle characteristic data memory device.

It is still further preferable that the vehicle detection device described above further includes a three-dimensional object area identifying device to identify a three-dimensional object area that displays a three-dimensional object existing in the imaging area based on the polarization difference of the identification processing areas calculated by the polarization difference calculation device, wherein the vehicle area detection device conducts the vehicle area detection process for the polarization differences of the three-dimensional object area identified by the three-dimensional object area identifying device.

It is still further preferable that the vehicle detection device described above further includes a road surface characteristic data memory device that stores road surface characteristic data indicating characteristics of the road surface, wherein the three-dimensional object area identifying device conducts a digitization process of the identification processing areas by comparing a polarization difference of the identification processing areas calculated by the difference polarization calculation device with a road surface identification threshold, identifies an identification processing area that displays the road surface as the road surface area using the road surface characteristic data stored in the road surface characteristic data memory device, and identifies remaining identification processing areas as the three-dimensional object areas.

It is still further preferable that the vehicle detection device described above further includes a particular three-dimensional object area identification device that identifies a particular three-dimensional object area that displays a predetermined particular three-dimensional object other than the vehicle in as portion of the imaging area that excludes the vehicle area identified by the vehicle area detection device.

As another aspect of the present invention, a vehicle detection method is provided which includes the steps of capturing two different polarized images from two differently polarized light beams reflected within an imaging area of an imaging device, the imaging area containing road surface, dividing the two polarized images taken by the imaging device into multiple identification processing areas, calculating a polarization difference indicating a ratio of a luminance difference between the two polarized images to a total luminance for each of the identification processing areas, and detecting a vehicle area displaying the vehicle in the imaging area based on the calculated polarization difference of the identification processing areas.

BRIEF DESCRIPTION OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein:

FIG. 1 is a function block diagram illustrating a driver-assistance system related to a first embodiment of the present disclosure;

FIG. 2 is a schematic flowchart illustrating the vehicle detection processing in the driver-assistance system;

FIG. 3 is a diagram illustrating an example of the structure of a polarizing camera usable in the driver assistance system;

FIG. 4 is a diagram illustrating another example of the structure of a polarizing camera usable in the driver assistance system;

FIG. 14A is a monochrome luminance image ahead of one's own vehicle relative to the traveling direction of one's own vehicle on a clear day taken by a polarizing camera mounted therein and FIG. 14B is the polarization difference image corresponding to the monochrome luminance image;

FIG. 15A is a monochrome luminance image ahead of one's own vehicle relative to the traveling direction of one's own vehicle on a rainy day taken by a polarizing camera mounted therein and FIG. 15B is the polarization difference image corresponding to the monochrome luminance image;

FIG. 16 is a schematic diagram illustrating the experiment in which polarization difference images are taken by a position-fixed camera while changing the position of the light source that irradiates an asphalt surface;

FIG. 22 is a schematic flowchart illustrating the vehicle detection processing in the driver-assistance system of the second embodiment; and FIG. 23 is a flowchart of the second embodiment of identifying the vehicle candidate area and the pedestrian candidate areas among the areas identified as three-dimensional object areas.

DETAILED DESCRIPTION OF THE INVENTION

First Embodiment

Figure 5:
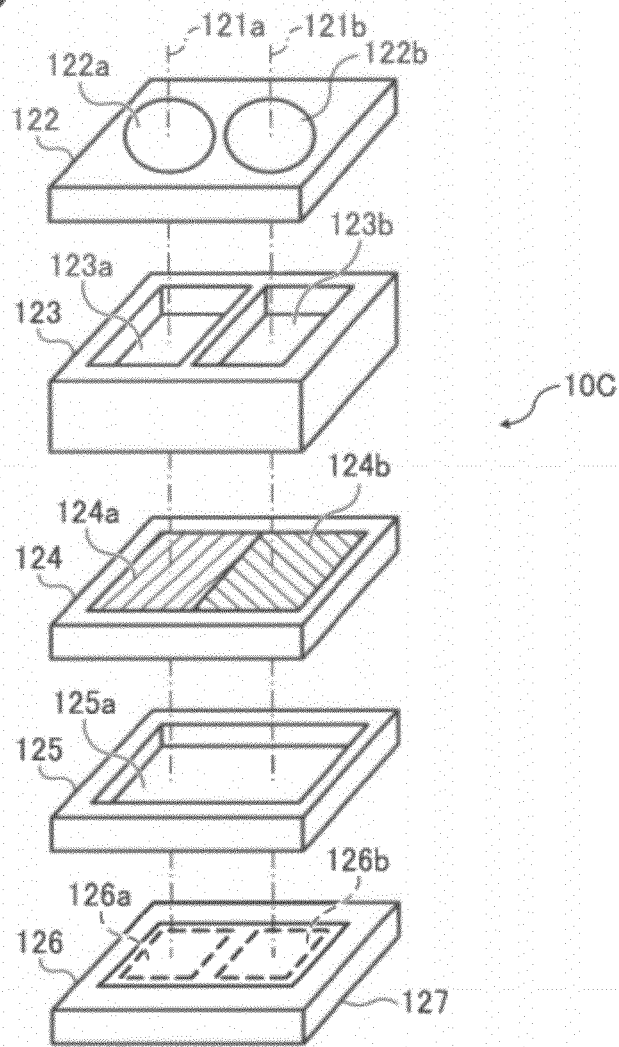
FIG. 5 is a diagram illustrating another example of the structure of a polarizing camera usable in the driver assistance system.

The vehicle recognition (identification) device related to the present disclosure is described in detail with reference to an embodiment (first embodiment) in which a driver-assistance system is applied to relieve the burden of driving on the driver of a vehicle. FIG. 1 is a function block diagram of a driver-assistance system related to the first embodiment of the present disclosure. FIG. 2 is a schematic flowchart illustrating the vehicle detection processing in the driver-assistance system of the first embodiment.

A polarizing camera 10 serving as an imaging device (image pickup device) mounted on one's own vehicle takes a photo of a landscape around the vehicle including the surface of roads on which vehicles travel to obtain polarized RAW image data including a vertical polarization intensity (hereinafter referred to as S polarization intensity) and a horizontal polarization intensity (hereinafter referred to as P polarization intensity) per pixel (identification processing area) (S1). Horizontally polarized image data obtained by P polarization intensity data contained in the polarization RAW image data are saved on a horizontally polarized image memory 11 and vertically polarized image data obtained by S polarization intensity data contained in the polarization RAW image data are saved on a vertically polarized image memory 12. These image data are transmitted into a monochrome image processing unit 21 and a polarization difference image processing unit 22.

The polarizing camera 10 is to take surrounding images having pixels having, for example, mega pixel size, by an image pickup device such as a CCD (charge-coupled device) and a CMOS (complementary metal oxide semiconductor) which are light receiving elements. It is preferable that the polarizing camera 10 acquire surrounding images continuously at a short time interval close to the real time. The polarizing camera 10 can be attached to a room view mirror to capture images of landscape (including road surface) ahead of one's own vehicle or a sideview mirror to capture images of landscape (including road surface) on sideways of one's own vehicle. Alternatively, the polarizing camera 10 can be attached to a rear door to capture images of landscape rear of the vehicle. In the first embodiment, the polarizing camera 1 is attached to a room view mirror to capture images of landscape (including road surface) ahead of one's own vehicle.

FIG. 3 is a diagram illustrating a configuration example of the polarizing camera 10. A polarizing camera 10A includes a rotary-driven rotation polarizer 102 that is arranged in front of a camera 101 having an image pickup element such as a CCD as illustrated in FIG. 3. In the polarizing camera 10A, the polarization direction of transmission light changes depending on the rotation angle of the rotation polarizer 102. Therefore, the camera 101 can capture the P polarization image and the S polarization image alternately by imaging while rotary-driving the rotation polarizer 102.

FIG. 4 is a diagram illustrating a configuration example of the polarizing camera 10. As illustrated in FIG. 4, a polarizing camera 10B uses two cameras 111 and 112 having an image pickup such as a CCD and an S polarization filter 113 that transmits S polarized light and a P polarization filter 114 that transmits P polarized light are arranged in front of the cameras 111 and 112, respectively. Since the polarizing camera 10A illustrated in FIG. 3 alternately takes images P polarized images and S polarized images by a single camera of the camera 101, the P polarized images and the S polarized images are not taken simultaneously. On the other hand, the polarizing camera 10B illustrated in FIG. 4 can take both the P polarized images and the S polarized images simultaneously.

FIG. 5 is a diagram illustrating another configuration example of the polarizing camera 10. As illustrated in FIG. 5, a polarizing camera 10C is similar to the polarizing camera 10B illustrated in FIG. 4 in terms that the image pickups are separately provided for the P polarization images and the S polarization images but greatly different in that each image pickup is more closely arranged than in the case of the polarizing camera 10B. The polarizing camera 10C can be reduced in size relative to the polarizing camera 10B illustrated in FIG. 4. The polarizing camera 10C illustrated in FIG. 5 has a laminate structure formed of a lens array 122, a light shield spacer 123, a polarization filter 124, a spacer 125, and a three-dimensional image pickup unit 126. The lens array 122 has two image pickup lenses 122a and 122b. These two image pickup lenses 122a and 122b are separate simple lenses having the same form formed of, for example, an aspheric lens and arranged in such a manner that optical axes 121a and 121b of the two lenses are parallel to each other in the same plane. The light shield spacer 123 has two through-holes 123a and 123b and are arranged on the other side of an object relative to the lens array 122. Each of the two through-holes 123a and 123b is of a predetermined size and centered on the optical axes 121a and 121b, respectively, with its inner wall painted black, coarsened, or matted to minimize reflection.

The polarization filter 124 is an area-divided polarizer filter having two polarizer areas 124a and 124b with their polarization planes shifted 90 degree from each other and is provided on the other side of the lens array 122 relative to the light shield spacer 123. The polarizer areas 124a and 124b change non-polarized light having an electromagnetic field vibrating in unidentified directions into a straight polarized light by transmitting only the vibration component (polarized component) in the direction along the polarization plane. An area-divided polarizer filter having a clear border can be obtained by employing a wire grid system formed of fine metal having a concavo-convex form or a photonic crystal system of autocloning type. The spacer 125 has a square form with a through-hole 125a having pierced portions corresponding to polarizer area polarizations a and b of the polarization filter 124 and is provided on the other side of the light shield spacer 123 relative to the polarization filter 124. The three-dimensional image pickup unit 126 has two three-dimensional image pickup elements 126a and 126b mounted on a substrate 127 and is provided on the other side of the polarization filter 124 relative to the spacer 125. In the first embodiment, monochrome sensing is conducted so that these two three-dimensional image pickup elements 126a and 126b do not have color filters. However, color filters are provided when sensing color images.

Figure 6:
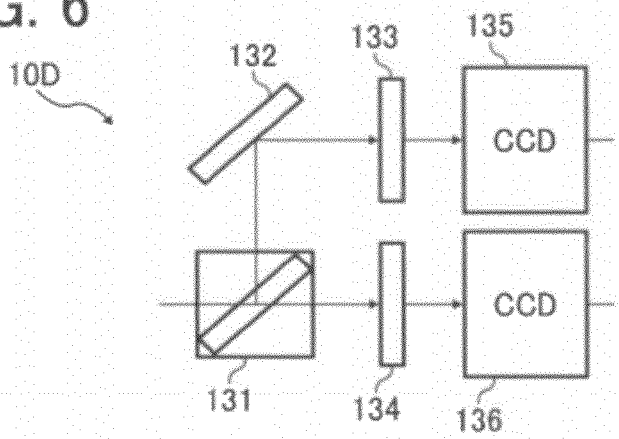
FIG. 6 is a diagram illustrating another example of the structure of a polarizing camera usable in the driver assistance system.

FIG. 6 is a diagram illustrating another configuration example of the polarizing camera 10. As illustrated in FIG. 6, a polarizing camera 10D has a half mirror 131 having a transmission property of 1:1, a reflection mirror 132, an S polarization filter 133, a P polarization filter 134, a CCD 135 for S polarization that receives S polarized light via the S polarization filter 133, and a CCD 136 for P polarization that receives P polarized light via the P polarization filter 134. Although the polarizing cameras 10B and 10C illustrated in FIGS. 4 and 5 can take S polarization images and P polarization images simultaneously, parallax difference inevitably occurs. On the other hand, the polarizing camera 10D illustrated in FIG. 6 takes S polarization images and P polarization images simultaneously using the same light received via a same image pickup optical system (lens). Therefore, the polarizing camera 10D is free from parallax difference. Therefore, correcting parallax difference is not necessary. In addition, a polarization beam splitter such as a prism that reflects P polarized light and transmits S polarized light can be used instead of the half mirror 131. By using such a polarization beam splitter, the system dispenses with the S polarization filter 133 and the P polarization filter 134, which leads to simplification of the optical system and improvement of the optical usage efficiency.

Figure 7:
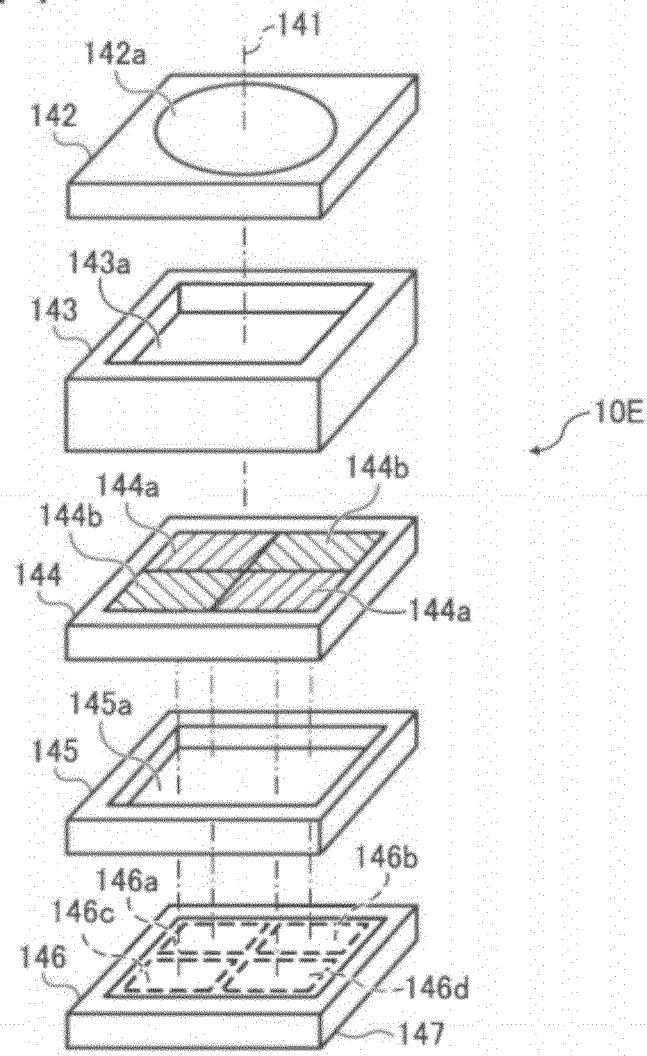
FIG. 7 is a diagram illustrating another example of the structure of a polarizing camera usable in the driver assistance system.

FIG. 7 is a diagram illustrating another configuration example of the polarizing camera 10. As illustrated in FIG. 7, a polarizing camera 10E is similar to the polarizing camera 10C illustrated in FIG. 5 in terms that the unit is a laminate unit having the camera configuration elements arranged along an optical axis 141 of an image pickup lens 142a but different in that the S polarization images and the P polarization images are taken by a single image pickup lens 142 although at least two image pickup lenses can be laminated on the optical axis 141. The polarizing camera 10E does not cause parallax difference between the S polarization image and the P polarization image as in the case of the polarizing camera 10D illustrated in FIG. 6. Furthermore, the polarizing camera 10E can be reduced in size relative to the polarizing camera 10D illustrated in FIG. 6. The polarization filter 144 of the polarizing camera 10E illustrated in FIG. 7 is an area-divided polarizer filter in which two of two kinds of polarizer areas 144a and 144b with their polarization plane shifted 90 degree from each other are provided and accordingly four three-dimensional image pickup elements 146a, 146b, 146c, and 146d are provided.

Figure 8:
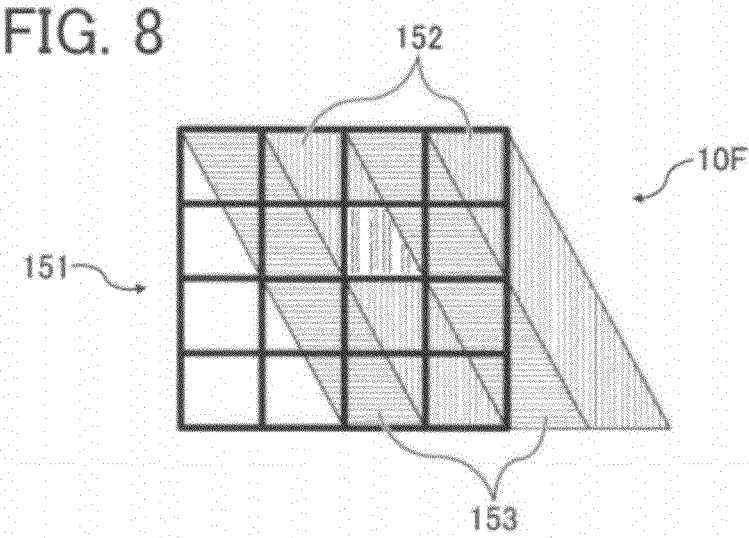
FIG. 8 is a diagram illustrating another example of the structure of a polarizing camera usable in the driver assistance system.

FIG. 8 is a diagram illustrating another configuration example of the polarizing camera 10. This polarizing camera 10F employs an area-divided filter as illustrated in FIG. 8. In FIG. 8, squares arranged in a matrix in a plane represent light receiving units 151 of each light receiving element. The areas represented by vertical lines represent areas of an S polarization filter 152 and the areas represented by horizontal lines represent areas of an P polarization filter 153. In this polarizing camera 10F, pixels of the light receiving element are not corresponded as in 1:1. The areas of each filter 152 and 153 have a width corresponding to one light receiving element in the horizontal direction and the slope of the border of the areas is two, that is, a slanted band form having an angle of changing the amount of two pixels in the vertical direction while advancing the amount of one pixel in the horizontal direction. By combining such a special filter arrangement pattern and signal processing, each filter transmission image can be reproduced as the entire image even if the positioning accuracy is insufficient when the image pickup element arrangement and the area dividing filter are jointed. Therefore, an inexpensive polarizing camera that can takes S polarization images and P polarization image can be manufactured.

The monochrome image processing unit 21 calculates monochrome luminance (P polarization intensity+S polarization intensity of the pixel) per pixel from the P polarization intensity data and the S polarization intensity data in the horizontally polarized image memory 11 and the vertically polarized image memory 12 (S2). Monochrome luminance images can be produced from the monochrome luminance of each pixel. The monochrome luminance data calculated by the monochrome image processing unit 21 is output to a vehicle recognition unit 26.

The polarization difference image processing unit 22 calculates polarization difference per pixel from the P polarization intensity data and the S polarization intensity data on the horizontally polarized image memory 11 and the vertically polarized image memory 12 (S3). From this polarization difference, a polarization difference image having a polarization difference per pixel as its corresponding pixel value can be produced. The polarization difference can be obtained by the following Relationship A. That is, the polarization difference is a ratio of the difference (luminance difference value) between the P polarization intensity and the S polarization intensity to the total value (luminance total value) of the P polarization intensity and the S polarization intensity. In addition, the polarization difference can be paraphrased as the difference value between the ratio (P polarization ratio) of the P polarization intensity to the total luminance and the ratio (S polarization ratio) of the S polarization intensity to the total luminance. In the first embodiment, the S polarization intensity is subtracted from the P polarization intensity. Alternatively, the P polarization may be subtracted from the S polarization intensity instead. Data of the polarization difference calculated by the polarization difference image processing unit 22 are output to a road surface and three-dimensional object identification unit 23.

Figure 9:
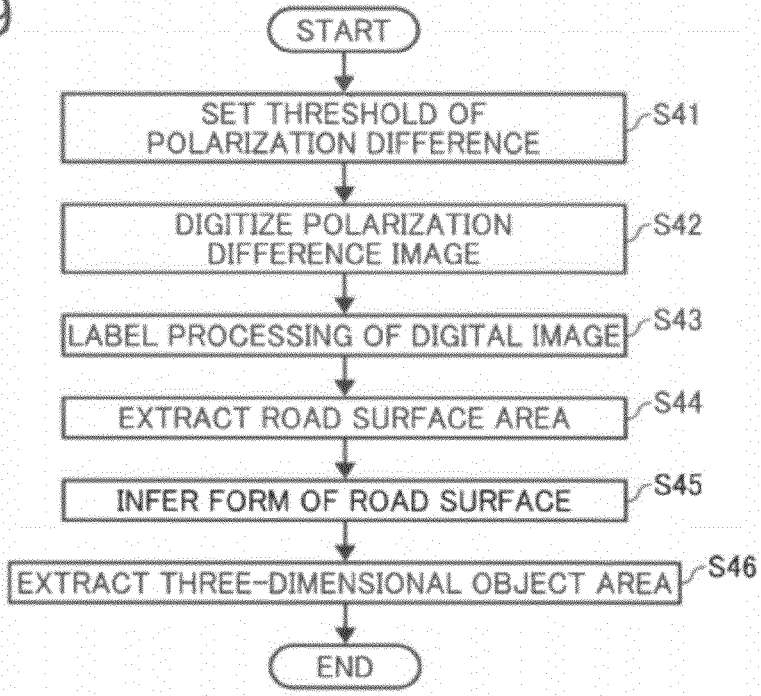
FIG. 9 is a flowchart illustrating a flow of processing of identifying (recognizing) a road surface and a three-dimensional object.

Polarization difference=(P polarization intensity−S polarization intensity)/(P polarization intensity+S polarization intensity) Relationship A The road surface and three-dimensional object identification unit 23 identifies the image area displaying the road surface and the image area displaying the three-dimensional object about the polarization difference image based on the polarization difference calculated by the polarization difference image processing unit 22 (S4). FIG. 9 is a flowchart illustrating a flow of processing of identifying the road surface and the three-dimensional object. Once the road surface and three-dimensional object identification unit 23 receives data of the polarization difference from the polarization difference image processing unit 22, the road surface and three-dimensional object identification unit 23 sets a threshold (S41) to digitize the polarization difference image and thereafter digitizes the polarization difference image by using the threshold (S42). To be specific, "1" is assigned to the pixel having a polarization difference equal to or greater than the threshold and "0" is assigned to the rest of the pixels to produce a digitized image. Thereafter, in this digitized image, when pixels to which "1" is assigned are close to each other, a labeling processing is conducted to recognize such pixels as one image area (S43). Therefore, a group of multiple pixels having a high polarization difference close to each other are extracted as one high polarization difference area. The thus-extracted high polarization difference areas are compared with the characteristic data of the road surface stored on the memory serving as a road surface characteristic data memory and the high polarization difference area that matches the characteristic data of the road surface is extracted as the road surface area (S44).

To be specific, when the number of pixels close to each other having a high polarization difference is measured and the measured value surpasses a predetermined threshold, the group of those pixels is extracted as a single high polarization difference area. Thereafter, the variance, the standard deviation, etc. of the pixel values of the multiple pixels extracted as the single high polarization difference area are calculated to determine the dispersion of the pixel values. When the dispersion of the pixel values is slight, to be specific, for example, the variance and the standard deviation do not surpass the predetermined threshold of the road surface characteristic data, the single high polarization difference area is extracted as the road surface area.

The method of extracting the road surface area is described in detail with reference to a specific example. First, an auto-correlation image data are generated about the extracted high polarization difference area using an L×L window. "L" represents an arbitrary number of pixels. In the first embodiment, the autocorrelation image data($\phi(\tau\eta)$) are calculated using the following Relationship 1. f(x,y) in the Relationship 1 represents the input image data, i.e., the pixel values in the extracted high polarization difference area and "$\tau$" and "$\eta$" represent the correlation distance. The integration range corresponds to the window size.

$$\phi(\tau,\eta)=\lim\int_{-L}^{L}\int_{-L}^{L}f(x,y)f(x+\tau,y+\eta)dxdy \qquad \text{Relationship 1}$$

Once the autocorrelation image data are produced, the symmetry property represented by the following Relationship 2 and the particle size represented by the following Relationship 3 are calculated as the index value data for comparison with the road surface characteristic data.

$$\text{Symmetry}=\frac{\sigma x}{\sigma y} \qquad \text{Relationship 2}$$

$$\text{Particle size}=\frac{(\sigma x+\sigma y)}{2} \qquad \text{Relationship 3}$$

"$\sigma x$" for use in calculating the symmetry property and the particle size represents the granularity degree (index value representing the variation degree of the pixels in the corresponding window or the roughness of an image with regard to the image) in the x direction and the "σy" represent the granularity degree in the y direction. These granularity degrees σx and σy can be calculated by the arithmetic expressions shown in the Relationship 4 from the autocorrelation image data. In the Relationship 4, "Ex" represents the gravity center in the x direction and "Ey" represents the gravity center in the y direction.

$$\Theta x(x) = \sum_{y=1}^{N} \phi(x, y)$$

$$\Theta y(y) = \sum_{x=1}^{N} \phi(x, y)$$

$$Ex = \frac{\sum_{i=1}^{N} i \times \Theta x(i)}{\sum_{i=1}^{N} \Theta x(i)}$$

$$Ey = \frac{\sum_{i=1}^{N} i \times \Theta y(i)}{\sum_{i=1}^{N} \Theta y(i)}$$

$$\sigma x = \sqrt{\sum_{i=1}^{N} (i - Ex)^2 \times \Theta x(i) \Big/ \sum_{i=1}^{N} \Theta x(i)}$$

$$\sigma y = \sqrt{\sum_{i=1}^{N} (i - Ey)^2 \times \Theta y(i) \Big/ \sum_{i=1}^{N} \Theta y(i)}$$

Relationship 4

When the thus calculated symmetry property and the particle size are within the predetermined thresholds, the extracted high polarization difference area is extracted as the road surface area. In addition, it is possible to set such conditions that the polarization difference (pixel values of the polarization difference image) in the extracted high polarization difference area is within the predetermined range, the monochrome luminance (pixel values of the monochrome luminance image) in the extracted high polarization difference area is within the predetermined range, the granularity degrees σx and σy in the extracted high polarization difference area are within the predetermined range, etc. to extract the corresponding extracted high polarization difference area as the road surface area.

After extracting the road surface area by such methods, the form of the thus-extracted road surface area is inferred by comparison with the road surface form patterns (S45) to identify both ends, i.e., the road edge lines, of the road surface area. Thereafter, the rest of the image areas other than the thus-extracted road area is extracted as the three-dimensional object area that displays the three-dimensional object (S46).

Figure 10:
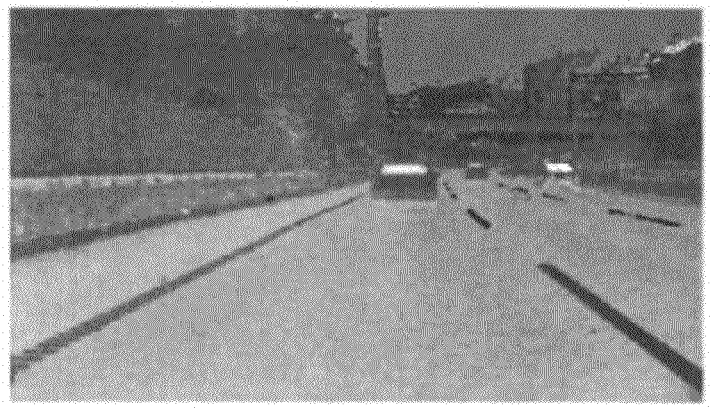
FIG. 10 is a polarization difference image taken by a polarizing camera mounted on a vehicle that is traveling on an express way.
Figure 11:
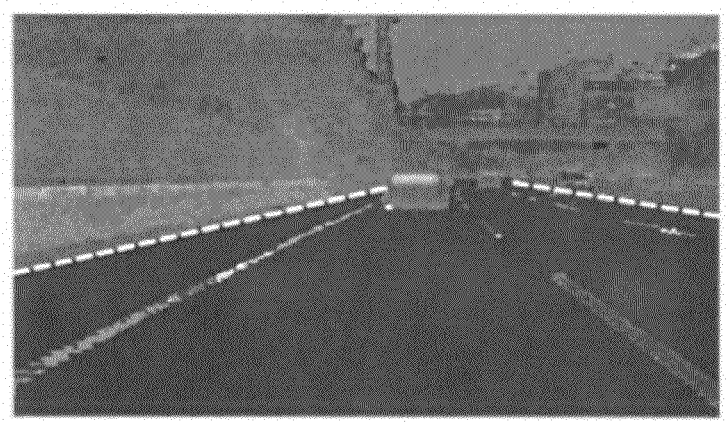
FIG. 11 is an image after the identification processing of a road and a three-dimensional object about the polarization difference image.

FIG. 10 is a polarization difference image taken by the polarizing camera 10 mounted on a vehicle that is traveling on an express way. FIG. 11 is an image after the identification processing of the road and the three-dimensional object about the polarization difference image. The black-painted image area in the image illustrated in FIG. 11 is extracted as the road surface area. In addition, the dotted lines in the image illustrated in FIG. 11 are the road edge line.

Figure 12:
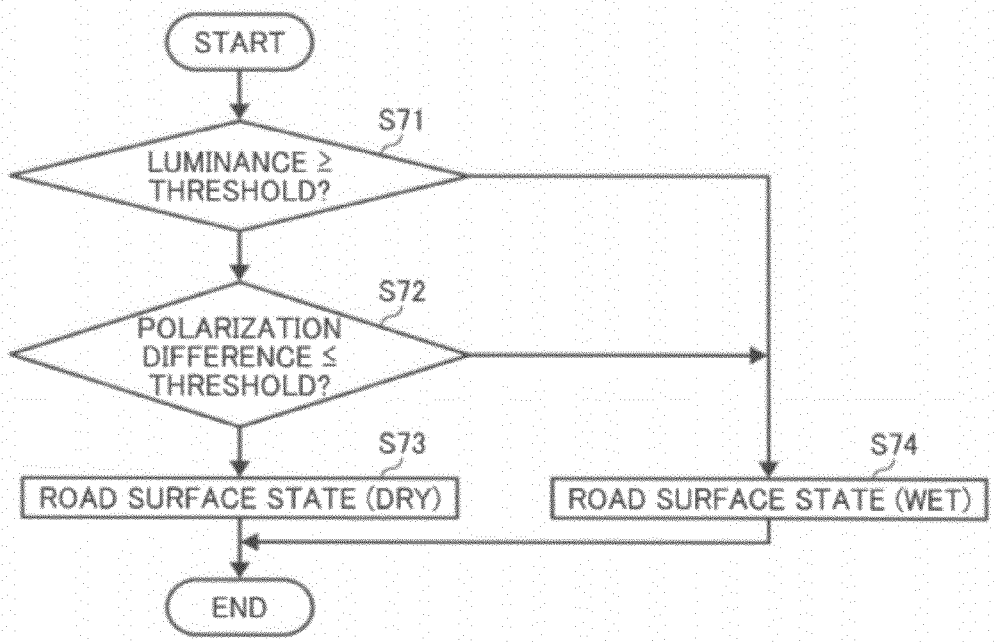
FIG. 12 is a flowchart of determining whether the road in the imaging area is wet or dry.

FIG. 12 is a flowchart of determining whether the road surface in the image pickup area is wet or dry. In the first embodiment, whether the road surface in the image pickup area is wet or dry is identified using the produced polarization difference image and monochrome luminance image and which is utilized in the vehicle detection system described later. In the identification process of the road surface state, whether the luminance value of a monochrome luminance image at a particular portion in the road surface area excluding the white lines drawn on the road surface is equal to or greater than a particular threshold first (S71). When the luminance value is judged as less than the particular threshold, the road surface is identified as wet (S74). On the other hand, when the luminance value is equal to or greater than the particular threshold, whether the polarization difference of the polarization difference image at the particular portion mentioned above in the road surface area excluding the white lines drawn on the road surface is equal to or less than a particular threshold (S72). When the polarization difference is judged as greater than the particular threshold, the road surface is identified as wet (S74). To the contrary, when the polarization difference is judged as equal to or less than the particular threshold, the road surface is identified as dry (S73). The threshold for the monochrome luminance image and the threshold for the polarization difference image for use in this identification (recognition) process of the road surface state are identified based on prior experiments In addition, in the first embodiment, sample images of respective polarization difference images about the wet road surface state and the dry road surface state are studied and optimal thresholds for digitizing process corresponding to each road surface state for use in S42 described above are identified in advance. According to the road surface state identified in the identification process of the road surface state illustrated in FIG. 12, the digitization process of the polarization difference image is conducted in S42 described above by using the threshold suitable for the road state selectively.

Figure 13:
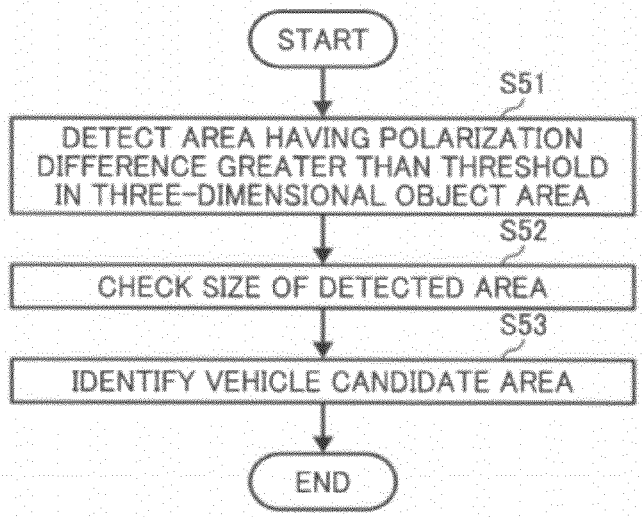
FIG. 13 is a flowchart of determining the vehicle candidate areas among the areas identified as three-dimensional object areas.

A vehicle candidate area determining unit 24 identifies a vehicle candidate area among the areas judged as the three-dimensional object area in S46 described above by using the characteristics of the polarization difference possessed by the light from the window of the vehicle (S5). FIG. 13 is a flowchart of determining the vehicle candidate areas among the areas identified as the three-dimensional object areas. The vehicle candidate area determining unit 24 identifies whether the polarization difference of each three-dimensional object area identified by the road surface and three-dimensional object identification unit 23 is equal to or greater than a particular threshold (within a particular range) and detects the three-dimensional object area having a polarization difference equal to or greater than the particular threshold (S51). Next, whether the area of the thus-detected three-dimensional object area is within the area corresponding to the window of the vehicle is checked (S52). Then, whether the three-dimensional object area that has passed the check has a form corresponding to the window of the vehicle is checked. The three-dimensional object area that has also passed this check is detected as the vehicle rear area (S53).

A vehicle recognition unit 26 identifies whether the vehicle candidate area identified by the vehicle candidate area determining unit 24 is a vehicle area by a pattern matching method of vehicle characteristic amount patterns saved on a vehicle characteristic amount pattern memory 25 using the monochrome luminance image obtained from the monochrome luminance data calculated by the monochrome image processing unit 21. Any known pattern matching method can be suitably used. For example, a pattern matching method using a characteristic amount of HOG characteristic based on the slope information in a local area, etc. can be used. With regard to the pattern matching method, for example, "Vehicle Detection by two-step AdaBoost Using Joint HOG characteristic" (page 2 to 106, published in 2008 (authored by Takahiro Ozaki, Yuji Yamauchi, and Hironobu Fujiyoshi, Dynamic Image Processing Application Workshop (DIA2008) can be used as a reference.

In the first embodiment, for example, a monochrome luminance image (front view image) produced by using the luminance data calculated by the monochrome image processing unit is displayed on a display unit 27 formed of CRT, liquid crystal, etc. which serves as an information notifying device in one's own vehicle. To notify the driver of the information indicating the area displaying another vehicle in the image as useful information for the driver, the information is displayed in a form convenient for the driver. By this display, for example, even if a driver is in a situation in which recognizing a (surrounding) vehicle by naked eyes is difficult for the driver, the driver can perceive the relative positional relationship of his own vehicle and the vehicle by looking at the front view image on the display unit, which makes it easy for the driver to keep safe driving by preventing crashing with the vehicle.

In addition, a vehicle control unit 28 of the first embodiment judges whether one's own vehicle travels too closely to a vehicle by a process of recognizing the relative positional relationship between one's own vehicle and the vehicle from, for example, the position information of the vehicle area identified by the vehicle recognition unit 26 and conducts a process of emitting an alarm sound when one's own vehicle approaches too closely to the vehicle, etc. Alternatively, when the vehicle approaches too closely to the vehicle, the vehicle control unit 28 may put on an autobrake to reduce the speed of the vehicle.

Next, in the process of the vehicle candidate area determining unit 24 described above, the mechanism of detecting the vehicle candidate area easily and precisely from the contrast of the image areas that display the window of a vehicle in the polarization difference image is described. FIG. 14 shows two images on a clear day taken by the polarizing camera 10 mounted in a vehicle to take images ahead of the vehicle relative to the traveling direction thereof. FIG. 14A is a monochrome luminance image and FIG. 14B is a difference polarization image. In comparison with these monochrome luminance image and difference polarization image, it can be confirmed that the difference polarization image of FIG. 14B is more distinct with regard to the window (windshield of an oncoming vehicle) than the monochrome image of FIG. 14A. That is, in a clear day, the window of the vehicle is more distinct with a high contrast in the polarization difference image than the monochrome luminance image.

FIG. 15 shows two images taken on a rainy day by the polarizing camera 10 mounted in one's own vehicle to take images ahead of the vehicle relative to the traveling direction thereof. FIG. 15A is a monochrome luminance image and FIG. 15B is a polarization difference image. In comparison with these monochrome luminance image and polarization difference image, it can be also confirmed that the polarization difference image of FIG. 15B is more distinct with regard to the window (windshield of an oncoming vehicle) than the monochrome image of FIG. 15A. That is, even in a rainy day, the window of a vehicle is more distinct with a high contrast in the polarization difference image than the monochrome luminance image.

The mechanism of such contrast occurring between the monochrome luminance image and the polarization difference image with regard to the window of a vehicle is described. In general, with regard to the monochrome luminance image, as felt in every day life, the contrast is high in a sunny place in daylight time while the contrast is low in a sunshade, or in a rainy or cloudy day. To the contrary, with regard to the polarization difference image, a high contrast image can be obtained in any of these environments because of the following.

Figure 17:
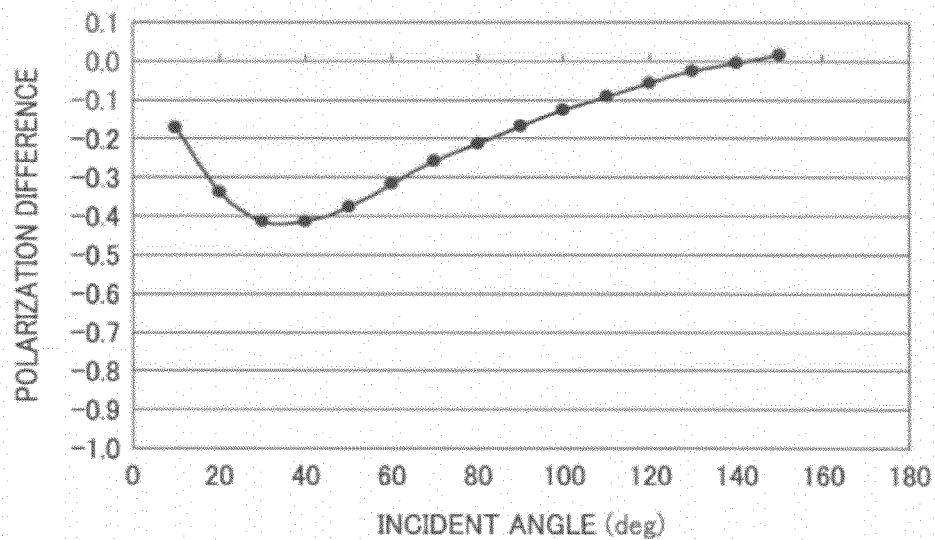
FIG. 17 is a graph illustrating an example of the change of the polarization difference obtained by taking images by a position-fixed camera while changing the position of the light source that irradiates the asphalt surface in the experiment room.
Figure 18:
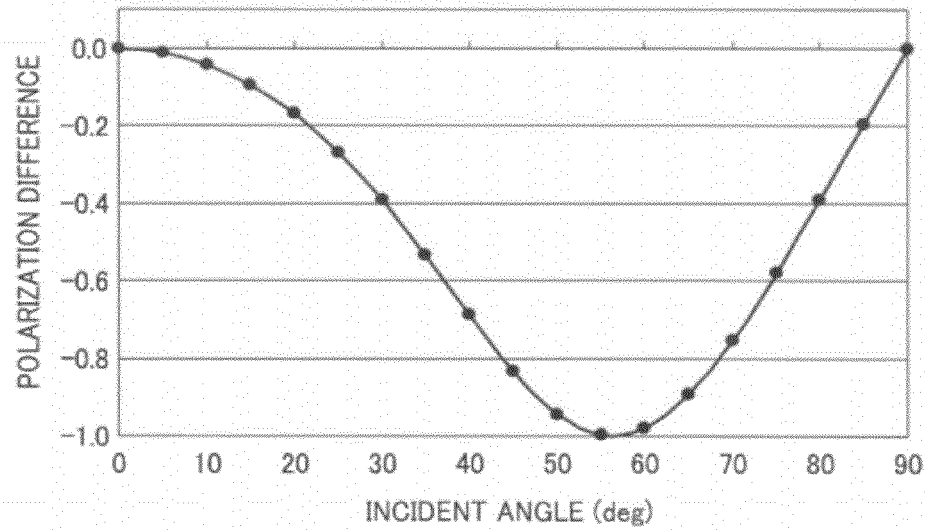
FIG. 18 is a graph illustrating an example of the change of the polarization difference obtained by taking images by a position-fixed camera while changing the position of the light source that irradiates the window (windshield) of a vehicle in the experiment room.

FIG. 17 is a graph illustrating an example of the change of the polarization difference obtained by taking images by a position-fixed camera while changing the position of the light source that irradiates the asphalt surface in the experiment room as illustrated in FIG. 16. FIG. 18 is a graph illustrating an example of the change of the polarization difference obtained by taking images by a position-fixed camera while changing the position of the light source that irradiates the windshield of a vehicle in the experiment room as illustrated in FIG. 16. In these graphs, X axis represents the incident angle (light source position) and Y axis represents the polarization difference. The camera elevation angle is 10 degree tilted from the horizon. The polarization difference is calculated from the substantially center areas of the images taken for each incident angle. The polarization difference in these graphs is a ratio of the difference obtained by subtracting the S polarization component (Rs) from the P polarization component (Rp) to the total value of the P polarization component and the S polarization component. Therefore, when the P polarization component is greater than the S polarization component, the polarization difference is a positive value. When the P polarization component is smaller than the S polarization component, the polarization difference is a negative value.

The polarization difference varies depending on the refraction index, the incident angle from the light source to the object, and the acceptance angle for the camera from the object. The surface of a road, typically made of asphalt, is a scattering surface and Fresnel reflection is true in a microscopic sense but can be represented by a scattering model in which such reflection exists in a constant probability distribution in a macroscopic sense. Therefore, the absolute value of the polarization difference is never "1". On the other hand, the windshield of a vehicle is a smooth surface so that Fresnel reflection is applicable as it is. Therefore, as illustrated in FIG. 18, the polarization difference is close to "−1" at a particular angle.

When these graphs are compared, it is acknowledged that the characteristics of the polarization difference are different between the asphalt surface and the windshield surface of a vehicle irrespective of the incident angle (light source position). In addition, according to experiments conducted by the present inventors, it is found out that the characteristics of the polarization difference about the vehicle body typically represent intermediate characteristics between those of the asphalt surface and those of the windshield, meaning that there is a difference between the body and the windshield of a vehicle about those characteristics. Therefore, on a clear day as illustrated in FIG. 14, the polarization difference of the asphalt surface and the vehicle body displayed around the windshield of the vehicle depends on the materials used and are greatly different from the polarization difference of the windshield. Therefore, with regard to the polarization difference image, the windshield of the vehicle looks more distinct than the adjacent portions thereof, which results in a high contrast therebetween.

Since the light source on a clear day is direct sun light from a particular direction, the polarization difference obtained from images of the road surface and the wind shield of a vehicle taken by the polarizing camera 10 mounted on one's own vehicle varies depending on the altitude and the direction of the sun. However, as described above, regardless of the change in the altitude and the direction of the sun, the contrast between the windshield of a vehicle and adjacent portions thereof is constantly high. Therefore, in a clear day, it is possible to identify the image area that shows the polarization difference surpassing a particular threshold in a polarization difference image as the windshield of the vehicle with a high degree of precision.

Figure 19:
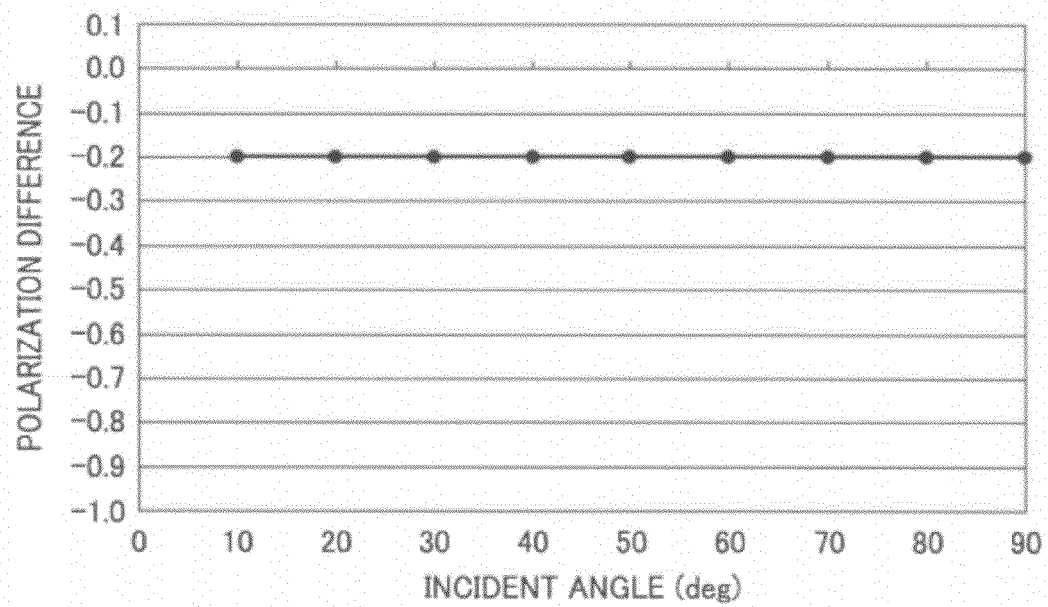
FIG. 19 is a graph illustrating that the polarization difference does not depend on the incident angle of light when images of the asphalt are taken in a rainy day.
Figure 20:
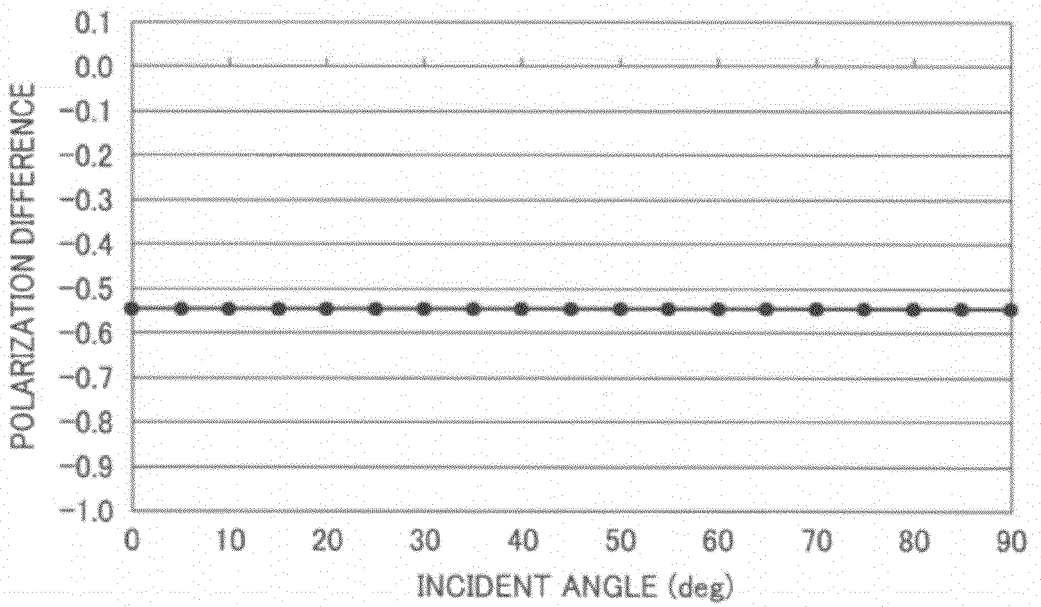
FIG. 20 is a graph illustrating that the polarization difference does not depend on the incident angle when images of the window (windshield) of a vehicle are taken in a rainy day.

Next, a rainy day as illustrated in FIG. 15 is described. The light source on a rainy day is not direct sunlight from a particular direction but uniform indirect light from the sky. In the case in which the indirect light from the sky is the light source as in a rainy day, the road surface and the windshield of a vehicle are evenly irradiated with light from the sky in every direction and altitude. Therefore, the polarization difference corresponding to the road surface and the polarization difference corresponding to the windshield of a vehicle have no dependency on the incident angle of light as illustrated in FIG. 19 or 20. In this experiment, as illustrated in FIG. 19, the polarization difference corresponding to the road surface on a rainy day is constant corresponding to a value substantially equal to the average of the graph illustrated in FIG. 17. Similarly, as illustrated in FIG. 20, the polarization difference corresponding to the windshield of a vehicle on a rainy day is constant corresponding to a value substantially equal to the average of the graph illustrated in FIG. 18. When both of the polarization differences of the road surface and the windshield of a vehicle on a rainy day are compared, it is found that there is a large difference between the two. In addition, the polarization differences of other objects such as a body portion of a vehicle that are displayed around the windshield of the vehicle are also greatly different from the polarization difference of the windshield. Therefore, with regard to the polarization difference image, the windshield of the vehicle looks more distinct than the adjacent portions thereof, resulting in a high contrast image in a rainy day. Therefore, in a rainy day, it is possible to identify the image area that shows the polarization difference surpassing the particular threshold in a polarization difference image as the windshield of the vehicle with a high precision. In addition, in a cloudy day or in a shadow environment, the same result as a rainy day environment is obtained.

However, the optimal threshold to detect the windshield of a vehicle using the polarization difference may be different depending on whether it is a clear day or a rainy day. For example, it is suitable to judge whether it is a clear day or a rainy day using the identification (identification) processing of the road surface state illustrated in FIG. 12 and then switch the thresholds based on the identification result.

There is a great advantage in the first embodiment that the processing speed is faster than the case in which pattern matching of the characteristic amount of a vehicle is conducted straight away for the entire area of a taken image because in the first embodiment the windshield of the vehicle is identified first with a high degree of precision using a polarization difference to determine the vehicle area by identifying one (or more) possible area from a number of the vehicle candidate areas based on the identification results before the pattern matching.

Second Embodiment

Next, a second embodiment of the vehicle recognition device related to the present disclosure which is applied to the same driver assistance system as the first embodiment is described. In the first embodiment, after the road surface and the three-dimensional object are identified (S4), the vehicle candidate area is identified by using the characteristic of the polarization difference of the light from the windowpane of the vehicle (S5) and the image area of the vehicle is finally detected among the vehicle candidate area (S6). In the second embodiment, among the three-dimensional object areas, other kinds of three-dimensional objects (pedestrians are taken as an example in the second embodiment) are detected in addition to the vehicles. In the description of the second embodiment below, only the points different from the first embodiment are described and describing the same points is omitted.

Figure 21:
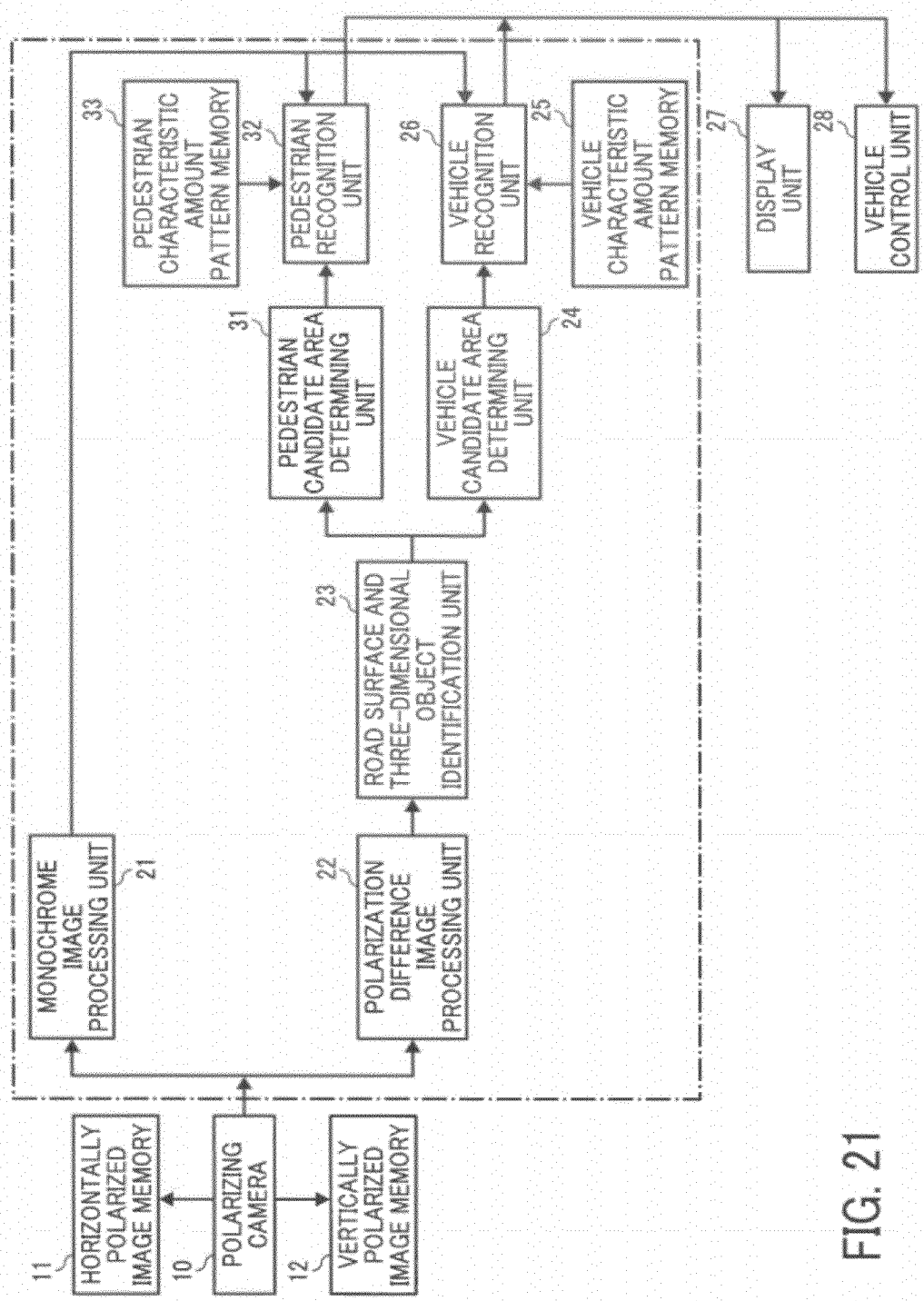
FIG. 21 is a function block diagram illustrating a driver-assistance system related to a second embodiment of the present disclosure.

FIG. 21 is a function block diagram of a driver-assistance system related to the second embodiment of the present disclosure. FIG. 22 is a schematic flowchart illustrating the vehicle and pedestrian detection processing in the driver-assistance system of the second embodiment. The vehicle candidate area and the pedestrian candidate area are identified in S5' and the vehicle and the pedestrian are detected (determined) by pattern matching as in the first embodiment (S6'). FIG. 23 is a flowchart determining the vehicle candidate area and the pedestrian candidate area (corresponding to S5') among the areas identified as three-dimensional object areas in the second embodiment.

In the second embodiment, in the vehicle candidate area determining unit 24, a vehicle candidate area 1 is detected by using the characteristics of the polarization difference of the light from the windowpane of the vehicle as described in the first embodiment from the image area (three-dimensional object area) in which the three-dimensional object identified by the road surface and three-dimensional object identification unit 23 is shown (S51 to 53). Next, in the second embodiment, in the vehicle candidate area determining unit 24, the vehicle candidate area 2 is detected from the characteristic of the form of the vehicle in the image (S54). To be specific, an image area formed of a group of the pixels containing the polarization difference within the predetermined range identified by using the characteristics of the polarization difference of the light from the body of the vehicle is extracted from the three-dimensional object area excluding the vehicle candidate area 1. A bounding rectangle of the extracted image area is made and the aspect ratio of the bounding rectangle is calculated. If the aspect ratio matches the characteristics of the form of the vehicle, the image area is identified as the vehicle candidate area 2 (S54). The thus identified vehicle candidate area 1 and vehicle candidate area 2 are identified as the vehicle candidate areas (S55). Whether the thus identified vehicle candidate areas are truly the vehicle areas is eventually identified in the vehicle recognition unit 26 in the same manner as in the first embodiment (S6')

In addition, in the second embodiment, in a pedestrian candidate area determining unit 31, the pedestrian area candidate area among the three-dimensional object area excluding the vehicle candidate area is identified using the characteristics about the form of pedestrians on the image (S56). To be specific, a bounding rectangle is formed for the three-dimensional object area excluding the vehicle candidate area and the aspect of the bounding rectangle is calculated. When the aspect matches the characteristics of the form of pedestrians, the image area is identified as the pedestrian candidate area (S56). The thus-determined pedestrian candidate area is thereafter identified in a pedestrian identification unit 32 whether the pedestrian candidate area is a pedestrian area in the same manner as conducted in the vehicle recognition unit 26 in the first embodiment 1 (S6').

The vehicle detection device related to the first and the second embodiments has the polarizing camera 10 serving as an image pickup device that receives two polarized light beams (P polarization component and S polarization component) having different polarization directions contained in light from the area of a taken image including the road surface on which one's own vehicle is traveling and a vehicle that is traveling on the road surface and takes respective polarization images (P polarization image and S polarization image); the polarization difference image processing unit 22 serving as a polarization difference calculation device that divides the P polarization image and the S polarization image taken by the polarizing camera 10 into respective particular identification processing areas and calculates the polarization difference indicating the ratio of the luminance difference between the P polarization image and the S polarization image to the luminance total thereof for the respective identification processing areas; and the vehicle candidate area determining unit 24 and the vehicle recognition unit 26 serving as a vehicle area detection device that detects the vehicle area that displays the vehicle in the area of a taken image based on the polarization difference of the respective identification processing areas calculated by the difference polarization image processing unit 22. In detail, in the vehicle candidate area determining unit 24, after whether the polarization differences for the respective identification processing areas calculated by the difference polarization image processing unit 22 are within the predetermined range (the range equal to or greater than a particular threshold) is identified, the identification processing areas having a value within the range are identified as the windows that display the window of the vehicle and the vehicle area is identified based on the identification result. Thereby, as described above, the identification processing area (window) that displays the window of the vehicle as the identification target object has a high contrast to the identification processing area that displays other objects such as part of the body and the road surface present around the window of the vehicle in the area of the taken image. In addition, as described above, since the polarization difference of the identification processing area that displays part of the body of the vehicle shows a greatly different value from the polarization difference about the objects therearound (such as the window and the road surface), a high contrast is obtained. Furthermore, with regard to the appearance of a vehicle such as the window and the body thereof, such a high contrast is also obtained irrespective of the weather, i.e., in a rainy, clear, or cloudy day or the environment in a sunny place or a shade in which the vehicle is traveling. Therefore, the vehicle can be identified with a high degree of precision irrespective of the environment. In addition, in the first and the second embodiments, the road surface and three-dimensional object identification unit 23 serving as a three-dimensional object area identifying device is provided to identify the three-dimensional object area that displays the three-dimensional object existing in the taken image area based on the polarization difference of the respective identification processing areas calculated by the difference polarization image processing unit 22. The vehicle candidate area determining unit 24 determines whether the polarization difference in the three-dimensional object image identified by the road surface and three-dimensional object identification unit 23 is within a predetermined range. Therefore, the vehicle candidate area determining unit 24 selects identification processing areas that display a vehicle with a high probability among all the identification processing areas and thereafter judges whether the polarization difference is within the range, that is, conducts the identification processing of windows so that the processing speed is faster than when conducting the identification processing of the window for all the identification processing areas. In particular, in the first and the second embodiments, the road surface and three-dimensional object identification unit 23 has a memory unit as a road surface characteristic data memory device in which the road surface characteristic data showing the characteristics of the road surface are stored, compares the polarization difference of each identification processing areas calculated by the difference polarization image processing unit 22 with predetermined road surface identification thresholds for digitizing the identification processing areas, identifies the identification processing areas showing the road surface as the road surface area using the road surface characteristic data stored in the memory, and identifies the rest of the identification processing areas as three-dimensional object areas. By conducting such processing, the three-dimensional object areas can be quickly and accurately identified. In addition, in the first and the second embodiments, the road surface and three-dimensional object identification unit uses the polarization difference calculated by the difference polarization image processing unit 22 and the luminance total (monochrome luminance) of the P polarization image and the S polarization image to detect the environment (whether the road surface status is dry or wet) for the objects existing in the image pickup area and corrects the road surface identification thresholds based on the result of the detected environment. Therefore, the road surface can be detected with a high degree of precision irrespective of the environment, thereby detecting the three-dimensional object area with a high degree of precision. In addition, in the first and the second embodiments, the vehicle characteristic amount pattern memory 25 serving as the vehicle characteristic data memory device that stores the vehicle characteristic data indicating the characteristics of the vehicle is provided and the vehicle recognition unit 26 determines whether the identification processing area is the vehicle area that displays the vehicle using the monochrome luminance total (luminance of the horizontally polarized image and luminance of the vertically polarized image) of the identification processing area identified as the window and the vehicle characteristics amount stored in the vehicle characteristic amount pattern memory 25. Therefore, the vehicle areas can be identified with a high degree of precision.

In the second embodiment, to the image area excluding the vehicle areas identified by the vehicle area detection device, the pedestrian candidate area determining unit 31 and the pedestrian identification unit 32 serving as a particular three-dimensional object area identification device are provided to conduct a pedestrian identification processing (particular three-dimensional object area identification processing) for identifying a pedestrian area (particular three-dimensional object area) that displays pedestrians predetermined as a particular three-dimensional object other than the vehicles in the imaging area. In addition to the vehicle characteristic amount pattern memory 25 of the first embodiment, a pattern matching method of pedestrian characteristic amount patterns saved on a pedestrian characteristic amount pattern memory 33 using the monochrome luminance image obtained from the monochrome luminance data calculated by the monochrome image processing unit 21. By recognizing the pedestrian area from the imaging area from which the vehicle area identified with high precision is excluded, misidentifying the vehicle area as the pedestrian area less occurs, thereby improving the identification precision of the pedestrian area. In the second embodiment, the case in which the particular three-dimensional object is a pedestrian is described but the particular three-dimensional object is not limited thereto. For example, the three-dimensional objects other than the vehicles include obstacles outside the road such as a guardrail, a power pole, a street lamp, a sign, and a curb on the roadside, an object of crash avoidance such as a man, an animal, and a bicycle present on a berm or a car road, and all the other three-dimensional objects having an exterior surface facing a direction other than the road surface.

The driver assistance system related to the first and the second embodiments is mounted on a vehicle but the whole system thereof is not necessarily mounted thereon. Therefore, for example, only the polarizing camera 10 is mounted on one's own vehicle and the rest of the system components are remotely provided in another place instead of the vehicle itself. In this case, a system by which someone other than the driver can recognize objectively the traveling state of the driver's vehicle can be provided.

What is claimed is:

1. A vehicle detection device comprising:
    imaging circuitry configured to capture two different polarized images from two differently polarized light beams reflected within an imaging area of the vehicle detection device, the imaging area containing a road surface;
    polarization difference calculation circuitry configured to divide each of the two polarized images captured by the imaging circuitry into a plurality of predetermined identification processing areas and calculate a degree of polarization difference indicating a ratio of a luminance difference between the two polarized images to a total luminance thereof for each of the plurality of predetermined identification processing areas; and
    vehicle area detection circuitry configured to conduct a vehicle area detection process of detecting a vehicle area in the imaging area by matching a stored vehicle characteristic amount pattern with at least one of the predetermined identification processing areas, by using luminance values associated with light reflected from a vehicle window wherein the polarization difference calculation circuitry generates a polarization difference image based on the degree of polarization difference, wherein
    each pixel in the polarization difference image is assigned a value of "1" based on whether an associated polarization difference exceeds a predetermined threshold, and
    areas of pixels that are assigned values of "1" are clustered into a single high polarization difference area,
    a road surface area, including the road surface, is specified based on dispersion of pixel values in the single high polarization difference area, and
    the vehicle area is detected upon excluding the road surface area.

2. The vehicle detection device according to claim 1, wherein the vehicle area detection circuitry is further configured to determine whether the polarization differences for the plurality of predetermined identification processing areas calculated by the polarization difference calculation circuitry are within a predetermined range of values, identify the at least one of the predetermined identification processing areas having a value within the predetermined range of values as the vehicle window, and conduct the process of detecting the vehicle area using the identification.

3. The vehicle detection device according to claim 2, further comprising a vehicle characteristic data memory that stores vehicle characteristic data indicating characteristics of a vehicle,
    wherein the vehicle area detection circuitry configured to determine whether the at least one of the predetermined identification processing areas identified as the vehicle window corresponds to a vehicle area that display the vehicle using the total luminance of the two polarized images obtained based on the plurality of predetermined identification processing areas and the vehicle characteristic data stored in the vehicle characteristic data memory.

4. The vehicle detection device according to claim 1, further comprising three-dimensional object area identifying circuitry configured to identify a three-dimensional object area that displays a three-dimensional object existing in the imaging area based on the degree of polarization difference calculated by the polarization difference calculation circuitry for each of the plurality of predetermined identification processing areas,
    wherein the vehicle area detection circuitry is further configured to conduct the process of detecting the vehicle area for polarization differences of the three-dimensional object area identified by the three-dimensional object area identifying circuitry.

5. The vehicle detection device according to claim 4, further comprising a road surface characteristic data memory that stores road surface characteristic data indicating characteristics of the road surface,
    wherein the three-dimensional object area identifying circuitry is further configured to conduct a digitization process with respect to each of the plurality of predetermined identification processing areas by comparing the polarization difference calculated by the difference polarization calculation circuitry with a road surface identification threshold, identify another one of the plurality of predetermined identification processing areas that displays the road surface as a road surface area using the road surface characteristic data stored in the road surface characteristic data memory, and identify remaining ones of the plurality of predetermined identification processing areas as the three-dimensional object areas.

6. The vehicle detection device according to claim 1, further comprising particular three-dimensional object area identification circuitry configured to identify a particular three-dimensional object area that displays a predetermined particular three-dimensional object other than a vehicle in a portion of the imaging area that excludes the vehicle area identified by the vehicle area detection circuitry.

7. A vehicle detection method comprising:
    capturing two different polarized images from two differently polarized light beams reflected within an imaging area of imaging circuitry, the imaging area containing a road surface;
    dividing the two polarized images taken by the imaging circuitry into multiple predetermined identification processing areas;
    calculating a degree of polarization difference indicating a ratio of a luminance difference between the two polarized images to a total luminance thereof for each of the multiple predetermined identification processing areas;
    detecting a vehicle area in the imaging area by matching a stored vehicle characteristic amount pattern with at least one of the predetermined identification processing areas, by using luminance values associated with light reflected from a vehicle window; and
    generating a polarization difference image based on the degree of polarization difference, wherein
    each pixel in the polarization difference image is assigned a value of "1" based on whether an associated polarization difference exceeds a predetermined threshold, and
    areas of pixels that are assigned values of "1" are clustered into a single high polarization difference area, a road surface area, including the road surface, is specified based on dispersion of pixel values in the single high polarization difference area, and the vehicle area is detected upon excluding the road surface area.

8. The vehicle detection device according to claim 6, wherein the particular three-dimensional object area identification circuitry identifies the particular three-dimensional object area that displays the predetermined particular three-dimensional object based on matching another one of the plurality of predetermined identification processing areas with a stored three-dimensional object characteristic pattern corresponding to at least one of: a guardrail, a power pole, a street lamp, a sign, and a curb on a roadside, and a crash avoidance object.

9. The vehicle detection method according to claim 7, further comprising:

storing at least one three-dimensional object characteristic pattern corresponding to at least one of: a guardrail, a power pole, a street lamp, a sign, and a curb on a roadside, and a crash avoidance object; and detecting a particular three-dimensional object area that displays a predetermined particular three-dimensional object based on matching another one of the multiple predetermined identification processing areas with by matching a stored vehicle characteristic amount pattern with the at least one stored three-dimensional object characteristic pattern.

* * * * *